United States Patent Office 3,438,733
Patented Apr. 15, 1969

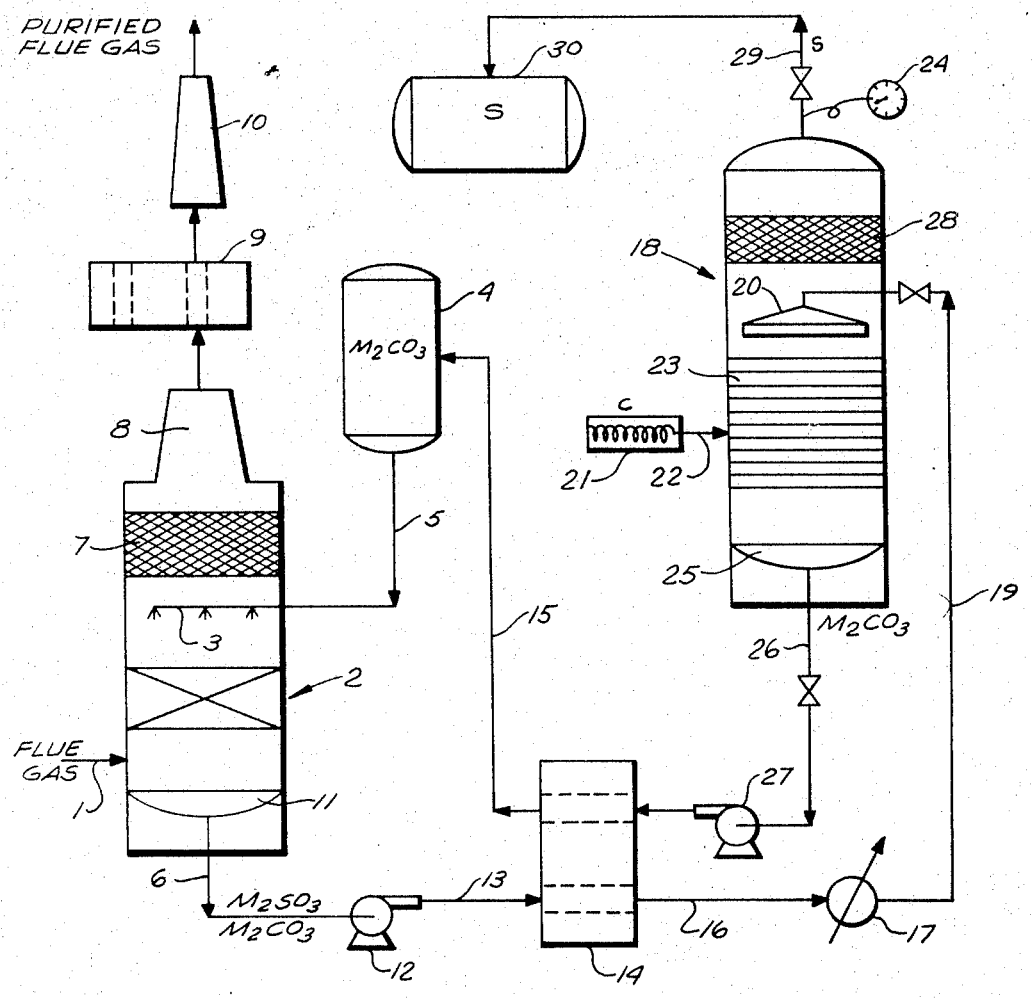

3,438,733
SULFUR PRODUCTION USING CARBON
REGENERANT
Le Roy F. Grantham, Calabasas, and Christian M. Larsen,
Reseda, Calif., assignors to North American Rockwell
Corporation, a corporation of Delaware
Filed May 15, 1967, Ser. No. 638,366
Int. Cl. C01b 17/02
U.S. Cl. 23—224                                    4 Claims

ABSTRACT OF THE DISCLOSURE

A method for removing sulfur dioxide from flue gas and recovering it as sulfur by (1) absorption of the sulfur dioxide in a molten salt mixture containing alkali metal carbonate to form alkali metal sulfite and (2) regeneration of the absorbent and formation of elemental sulfur by reacting the alkali metal sulfite-containing absorbent solution with a carbonaceous material, preferably activated carbon, under reaction conditions favoring formation of sulfur.

Cross references to related applications

The method for removing sulfur dioxide from flue gas by absorption of the sulfur dioxide in a molten alkali metal carbonate mixture to provide the feedstock for the single-stage regeneration process of the present invention wherein the sulfur dioxide is recovered as elemental sulfur is described in patent application S.N. 638,528 (6A16), filed May 15, 1967 and assigned to the assignee of the present invention.

Other regeneration processes that may also be utilized for treatment of the resultant absorbent solution provided by the process described in S.N. 638,528 are described in the following patent applications, all filed May 15, 1967 and assigned to the assignee of the present invention: "Two-Stage Regeneration of Absorbent for Sulfur Oxides" S.N. 638,529 "Absorbent Regeneration Using Carbon Regenerant" S.N. 638,365, "Sulfur Production Using Carbon Oxide Regenerant" S.N. 638,530, and "Electrochemical Method for Recovery of Sulfur Oxides" S.N. 638,364.

Background of the invention

This invention relates to a process for the removal of sulfur compounds from hot combustion gases and their recovery as elemental sulfur. It particularly relates to a process wherein the sulfur dioxide content of a flue gas is removed by absorption in a molten alkali metal carbonate-containing solution, and the absorbent is regenerated by a single-stage regeneration process utilizing carbon, sulfur values being recovered from the resultant absorbent solution directly in the form of elemental sulfur.

Sulfur oxides, principally as sulfur dioxide, are present in the waste gases discharged from many metal refining and chemical plants and in the flue gases from electric power plants. The control of air pollution resulting from this discharge of sulfur oxides into the atmosphere has become increasingly urgent. An additional incentive for the removal of sulfur oxides from waste gases is the recovery of sulfur values otherwise lost by discharge to the atmosphere. However, particularly with respect to the flue gases from power plants, which based on the combustion of an average coal may contain as much as 3000 p.p.m. sulfur dioxide and 30 p.p.m. sulfur trioxide by volume, the large volumes of these flue gases relative to the quantity of sulfur which they contain make removal of the sulfur compounds from these gases expensive. Also, while the possible by-products, such as elemental sulfur and sulfuric acid, that may be ultimately obtained from the recoverable sulfur values have virtually unlimited markets as basic raw materials, they sell for relatively low figures. Consequently, low-cost recovery processes are required.

Many processes have been proposed and investigated for the desulfurization of flue gases. In a typical wet absorption process, the flue gas is washed with an alkaline aqueous solution or slurry. Thus the use of an aqueous slurry of calcium hydroxide or calcium carbonate has been investigated in several British power plants. In other wet processes, aqueous ammonia or aqueous sodium sulfite solutions have been utilized as washing fluids. While these wet processes have some advantageous features, they all suffer from the common drawback of the flue gas being cooled substantially and becoming saturated with water vapor in the absorption tower. This cooling of the gas decreases the overall efficiency of the process because of the additional power requirements for dispersal of the flue gas to the atmosphere. Further, the associated condensation and precipitation of evaporated water containing contaminants in the surrounding environment creates substantial problems.

In the dry processes using solid adsorbents, sulfur dioxide is removed either by chemical reaction with the adsorbent or by adsorption followed by oxidation of the adsorbed sulfur dioxide. In one such process shown in U.S. Patent 2,718,453, finely powdered calcium carbonate is blown into the combustion gas to form calcium sulfate or calcium sulfite. In general a reaction between a solid and gas is relatively slow and inefficient, being limited to the available surface area of the solid. Also, the resultant products do not readily lend themselves to regeneration of the starting carbonate material or recovery of the removed sulfur values.

In one regenerative dry process, the flue gas is contacted with activated lignite char at about 200° C., sulfur dioxide being adsorbed and converted immediately by the oxygen and water present in the flue gas to sulfuric acid. The char is regenerated by heating about 400° C. to yield a desorbed gas of high sulfur dioxide content. In another dry process, pellets of alkalized alumina are used as adsorbent to remove sulfur dioxide. Undesirably, this adsorbed material is oxidized to sodium sulfate by the catalytic action of the alkalized alumina. The saturated adsorbent is regenerated by heating it at 600° C. with a reducing gas. The solid adsorbent processes are disadvantageous in being surface area limited and further because of the difficulties involved in the handling and moving of large quantities of the solid adsorbent which would be required in large-scale process applications.

In a catalytic oxidation process, sulfur dioxide is converted to sulfur trioxide at a temperature of about 400–430° C. by catalytic oxidation using alumina-supported platinum or vanadia catalysts, followed by hydration to sulfuric acid. While the concept of direct oxidation is potentially attractive, very extensive prior purification of the flue gases is required to avoid poisoning of the catalyst and contamination of the produced sulfuric acid. Also, the resultant 70 wt. percent sulfuric acid produced in such a process is very corrosive at the condensation temperature involved, and therefore requires the use of very large and expensive corrosion-resistant equipment. Further, sulfuric acid of this concentration has a very limited market.

Summary of the invention

It is an object of the present invention to provide a highly efficient method for the absorption of sulfur dioxide and sulfur trioxide from flue gases using inexpensive, readily available materials and avoiding the use of expensive equipment. In addition to the absorption stage, the process provides a single-stage regeneration of the absorbent and direct recovery of the sulfur values as elemental sulfur without prior conversion to hydrogen sulfide gas.

In accordance with this invention, a sulfur removal process is provided comprising an absorption stage utilizing a molten salt mixture containing alkali metal carbonate and a single-stage regeneration utilizing a carbonaceous material, the present process being directed to an improvement in this regeneration stage so that the sulfur values are recovered as elemental sulfur directly.

In the absorption stage, described and claimed in copending application Ser. No. 638,528, sulfur oxides present in a hot combustion gas generally produced by burning a sulfur-containing hydrocarbon or fossil fuel are removed from the combustion gas by contacting the gas at a temperature of at least 350° C. with a molten salt mixture containing alkali metal carbonates as active absorbent to thereby remove the sulfur oxides. The melting temperature of the salt mixture is preferably between 350 and 450° C. The resultant sulfur compound that is formed consists principally of alkali metal sulfite, derived from the sulfur dioxide, and may also contain alkali metal sulfate, derived from the $SO_3$ initially present or formed by oxidation of a portion of the formed sulfite.

In copending application Ser. No. 638,365 a two-stage regeneration process is shown in which in a first reduction step, the resultant sulfite-containing molten absorbent solution is treated with a carbonaceous material providing reactive carbon to convert absorbed sulfur values to alkali metal sulfide in the molten salt in accordance with the following exemplary equations:

$$2M_2SO_3 + 3C \rightarrow 2M_2S + 3CO_2\uparrow$$
$$M_2SO_4 + 2C \rightarrow M_2S + 2CO_2\uparrow$$

A second reformation step then follows in which the alkali metal sulfide-containing molten salt is treated with a gaseous mixture containing steam and carbon dioxide to regenerate the alkali metal carbonate and convert the alkali metal sulfide to hydrogen sulfide gas. This hydrogen sulfide gas is then used as a feedstock for conversion to sulfur or sulfuric acid.

Where sulfur is desired as the ultimate product, the present process provides an improvement in the regeneration stage in which there is provided by a single-stage reaction direct conversion of alkali metal sulfite to elemental sulfur together with regeneration of the alkali metal carbonate, in accordance with the following overall exemplary equation:

$$2M_2SO_3 + 2C \rightarrow S_2 + 2M_2CO_3$$

M preferably denoting a ternary mixture of Li, Na, and K, excess $M_2CO_3$ molten salt being used as carrier solvent.

The single-stage regeneration reaction is performed at a temperature above 325° C. at which the salt is molten, suitably between 325 and 650° C. where, in addition to the alkali metal carbonate salts, other diluent salts are present which serve to lower the melting temperature of the melt. A temperature between 450 and 550° C. is preferred and is particularly desirable where only the ternary alkali metal carbonate salt is present as carrier solvent.

*Brief description of the drawing*

The sole figure of the drawing shows a schematic flow diagram illustrating the absorption and regeneration stages of a preferred embodiment of the invention for the treatment of hot combustion gases obtained by the burning of a sulfur-containing fossil fuel in an electric generating plant.

*Description of the preferred embodiments*

The present invention is broadly directed to an improvement in a single-stage regeneration process for treating the absorbent solution obtained by absorption of sulfur oxides in a molten salt mixture containing alkali metal carbonates as reactive absorbent. The absorption stage per se is described and claimed in S.N. 638,528, which is incorporated herein by reference, and the foregoing copending application should be consulted for fuller details of the absorption stage of this process. In the absorption stage, sulfur oxides present in a hot combustion gas generally produced by burning a sulfur-containing hydrocarbon fuel are removed from the combustion gas by contacting the gas at a temperature of at least 350° C. with a molten salt mixture containing alkali metal carbonates as active absorbent to thereby remove the sulfur oxides. In a preferred aspect of practicing the absorption stage, the combustion gas is treated with a molten ternary salt mixture of the carbonates of lithium, sodium, and potassium, molten at 400° C., to convert $SO_2$ present to alkali metal sulfite according to the following equation:

$$M_2CO_3 + SO_2 \rightarrow M_2SO_3 + CO_2$$

where M denotes a ternary mixture of Li, Na, and K, excess $M_2SO_3$ molten salt being used as carrier solvent. Suitably, this preferred reaction is performed at a temperature between 395 and 600° C. and particularly between 400 and 450° C., approximately corresponding to the temperature of a typical power plant flue gas.

The present invention will be particularly illustrated with respect to the removal of sulfur oxides from hot combustion gases obtained by the burning of sulfur-containing fossil fuels, particularly in electric generating plants. Referring to the drawing, a flue gas obtained from the combustion of a sulfur-containing coal at a temperature of about 425±25° C. is admitted by way of a conduit 1 to an absorber unit 2. For a typical 1000-mw.(e) coal-fired electric utility plant utilizing coal containing 3 wt. percent sulfur, about 4,650,000 cubic ft./min. flue gas with an $SO_2$ content of about 0.18 vol. percent is generated. The flue gas is passed through a fly ash precipitator (not shown) to remove fine particles entrained therein, prior to entry into the absorber. For a 1000-mw.(e) plant, absorber unit 2 ordinarily consists of five stainless steel cyclone spray towers in parallel arrangement. These towers are suitably insulated with about 5 inches of high temperature insulation so that the temperature drop within them is less than five degrees centigrade.

The flue gas enters tangentially at the base of absorber 2 and travels upwardly with a velocity of about 20 ft./sec. It is contacted countercurrently by a spray of molten carbonate (M.P. about 400° C.) which is discharged through a spray distributor 3 located about 15 ft. above the base of the absorber tower. The molten carbonate salt is contained in a storage vessel 4, which is suitably insulated and equipped with heaters so as to maintain the carbonate salt in a molten state. The molten salt leaves vessel 4 by way of conduit 5 connected to spray distributor 3 at a flow rate adjusted to provide about 10–30 mole percent sulfite content in the effluent molten salt stream leaving the bottom of absorber 2 by way of a conduit 6.

Because of the rapidity of the chemical reaction between the molten carbonate and the gaseous sulfur dioxide to form alkali metal sulfite, a gas residence time of less than a second is sufficient for a spray height of 15 feet. In addition to the chemical reaction requirements, the flow rate of the flue gas is also determined by the need for minimizing entrainment and pressure drop in the absorber as well as by the spray distribution pattern of the molten carbonate. Any of various well-known contact methods and equipment may be used to insure rapid reaction between the gaseous sulfur dioxide and the molten liquid carbonate such as use of wet-wall contactors or packed columns or absorbers containing perforated plates or bubble-cap trays. However, the spray technique is generally preferred because of its relative simplicity and efficiency.

After contacting the molten carbonate spray, the desulfurized flue gas flows past distributor 3 into a wire demister 7, which is about one foot thick and located in the upper section of the absorber tower about two feet above the distributor. The demister serves to remove entrained salt-containing droplets from the flue gas, which is then passed through a conical transition section 8 to minimize pressure drops in the absorber tower and then through a plurality of heat exchangers 9, from which it emerges at a temperature of about 150° C. Heat exchangers 9 may serve as preheaters for the water and the air used in the generating plant. The cooled flue gas from heat exchangers 9 is discharged to the atmosphere through a power plant stack 10. Conventional power plant stacks are 400 to 800 feet high so that mixing in the atmosphere will considerably reduce the ground level concentration of the sulfur dioxide ordinarily present in the emitted stack gases. Since the present process is capable of eliminating 99.9 vol. percent of the sulfur dioxide content of the flue gas, the resultant ground level concentration of sulfur dioxide under ideal conditions is virtually nonexistent, i.e., less than one part per billion.

The molten mixture of alkali metal carbonates in vessel 4 serves as the active absorbent. Where the melt consists essentially of only the alkali metal carbonates, a ternary mixture consisting of potassium carbonate, lithium carbonate, and sodium carbonate is utilized having a melting point between 400 and 600° C. A mixture containing approximately equal amounts by weight of the carbonates of potassium, lithium, and sodium has a melting point of about 395° C., about that of the eutectic composition. Since the low melting region around the eutectic temperature is quite broad, a relatively large variation in composition ($\pm 5$ mole percent) does not change the melting point markedly. Thus, a suitable ternary eutectic composition range, in mole percent, consists of $45\pm 5$ lithium carbonate, $30\pm 5$ sodium carbonate, and $25\pm 5$ potassium carbonate.

Data for the free energy of reaction between $SO_2$ and $M_2CO_3$ to form $M_2SO_3$ show that thermodynamically this reaction is favored at lower temperatures. Therefore, the absorption of $SO_2$ is preferably carried out at temperatures as close to the melting point of the mixed carbonate eutectic as is feasible from plant operating considerations. Further, in order to minimize equipment corrosion and economize on fuel costs, it is additionally preferred to utilize a molten carbonate-containing mixture having as low a melting point as feasible.

Other nonreactive molten salts may be combined with the alkali metal carbonates to serve as inexpensive diluents or to lower the melting temperature of the mixture. For example, a lithium-potassium salt mixture containing chloride, sulfite, and carbonate is molten at a temperature of 325° C. Where such diluent salts are utilized, either a single alkali metal carbonate or a binary or ternary mixture of the alkali metal carbonates is combined therewith, the final mixture containing two or more alkali metal cations. In such a system as little as 2 mole percent of alkali metal carbonate may be present with the remaining 98 mole percent being an inert diluent carrier, although at least 5–10 mole percent of alkali metal carbonate is preferable. Illustrative of such a suitable mixture is one utilizing a LiCl-KCl eutectic (M.P. 358° C.) wherein the starting salt ratio consit of 64.8 mole percent LiCl and 35.2 mole percent KCl. An absorbent molten mixture containing 90 mole percent of the LiCl-KCl eutectic and 10 mole percent of a corresponding molar ratio of potassium and lithium carbonate has a melting point of about 375° C. Suitable chloride-carbonate molten salt mixtures contain, in mole percent 15–60 K+, 40–85 Li+, and 0–20 Na+ as cations and 10–98 Cl− and 2–90 $CO_3^=$ as anions.

Although the melting points of the pure alkali metal sulfites and sulfides are considerably higher than those of the mixed alkali metal carbonates, if a sulfite or sulfide is substituted for only a portion of the carbonate the melting point is lowered, thereby making feasible the circulation of sulfite-containing carbonate melt without the need for additional heat input to keep the circulated salt molten, which would be required were sulfite obtained alone as the reaction product. An alkali metal sulfite content of 10–30 mole percent of the molten salt is preferred.

The molten sulfite-containing cabonate resulting from the rapid reaction between the molten carbonate spray and the flue gas is collected in a dished-bottom heated sump 11 of absorber 2. About a 70 mole perment excess of unreacted carbonate is maintained to serve as a solvent for the sulfite formed by the reaction. The sulfite-carbonate mixture is pumped from sump 11 of absorber 2 through conduit 6 by way of a pump 12, then through a conduit 13 to a heat exchanger 14. The sulfite-carbonate mixture entering heat exchanger 14 is at a temperature of about $425\pm 25°$ C. Its temperature is increased in the heat exchanger, and at the same time the temperature of regenerated molten carbonate being returned to storage vessel 4 by way of a conduit 15 is lowered. The mixture leaves heat exchanger 14 by way of a conduit 16 and passes through a heater 17, which is optionally utilized for further increasing the temperature of the mixture, where required, to about $500\pm 25°$ C. For certain feedstocks, the reaction temperature used in the regenerator unit may be the same as that of the molten alkali metal sulfite-containing melt leaving absorber unit 2, thereby eliminating any need for heat exchanger 14 or auxiliary heater 17. The sulfite-carbonate mixture enters a regenerator unit 18, which is suitably pressurized, by way of a valved conduit 19 where it is fed into a trickle distributor 20. While other liquid-solid contact techniques may be used, it is generally preferred to trickle the molten liquid over the solid carbonaceous bed in order to obtain optimum contact conditions for the regeneration reaction.

The overall chemical reaction in the single-stage regenerator unit 18 involves concurrent reduction of the alkali metal sulfite to elemental sulfur and regeneration of alkali metal carbonate by treatment of the alkali metal sulfite-carbonate melt with a carbonaceous material effectively providing reactive carbon, preferably in solid or liquid form so as to provide maximum contact, and preferably in the form of activated carbon because of its fine porosity and high surface area. The term "carbonaceous material" includes hydrocarbons which decompose or dissociate to provide the desired reactive carbon. However, carbonaceous materials that produce excess amounts of reaction products that may interfere with the principal reaction should generally be avoided. By the term reactive carbon, reference is made to carbon in an available form for the regeneration reaction. Activated carbon in the form of hard granules or pellets is particularly preferred, as is elemental carbon in the form of coke, charcoal, or carbon black. However, from the point of view of process economics, waste carbonaceous materials ordinarily heavily contaminated with sulfur-containing materials, as obtained from petroleum-and coal-refining processes, are suitable as carbon feedstocks for use in the practice of the present invention. To provide a more rapid initial reaction, a source of active carbon is initially utilized, other sources of carbon such as petroleum coke, asphalts, tars, pitches or the like, then being used subsequently.

Referring to the drawing, a source of carbon 21 is used to provide a carbonaceous material by way of a screw feed 22 to a supported bed 23 in regenerator unit 18. The molten sufite-carbonate mixture trickling from distributor 20 reacts with the carbon in bed 23 at a temperature of $500\pm 25°$ C., the sulfite generally being present in stoichiometric excess to minimize formation of alkali metal sufide, the following overall reaction occurring:

$$2M_2SO_3 + 2C \rightarrow S_2 + 2M_2CO_3$$

alkali metal sulfide may be formed by the following reaction:

$$2M_2SO_3 + 3C \rightarrow 2M_2S + 3CO_2\uparrow$$

removal of evolved carbon dioxide promoting the reaction. The formation of alkali metal sulfide can be eliminated or minimized in the present process by maintaining the sulfite in excess and by maintaining the carbon dioxide within the vessel under pressurized conditions so that reaction occurs between any intermediately formed alkali metal sulfide and $CO_2$ according to the following reaction:

$$2M_2S + 3CO_2 \rightarrow S_2 + 2M_2CO_3 + C$$

The formation of $CO_2$ can be monitored by observing the gas pressure by means of a pressure gage 24. By preventing evolution of formed carbon dioxide from the reaction vessel, it can be made to react with any alkali sulfide present in accordance with the foregoing equation.

Alkali metal polysulfide, which is thermally decomposable to yield sulfur, may be formed as an intermediate product in the regenerator by reaction of formed sulfur with intermediately formed alkali metal sulfide. However, continued reaction of sulfide and polysulfide with $CO_2$ will serve to decompose any formed polysulfide and favor formation of alkali metal carbonate and elemental sulfur.

From both a thermodynamic and kinetic standpoint, the rate of the overall reaction is increased by increased temperature and carbon dioxide pressure. For most applications, a temperature range between 325 and 650° C. at which the sulfite-containing salt is molten is suitable, a temperature between 450 and 550° C. being preferred. Where only sufite and carbonate is present in the melt, a temperature range of 395–650° C. is suitable, a range of 450–550° C. being preferred. With other salt diluents present that lower the melting point, a temperature range of 325–650° C. is suitable, a range of 450–550° C. also being preferred.

Upon substantial completion of the reaction between the molten sulfide-carbonate mixture and the carbon, molten alkali metal carbonate, including both regenerated and carrier carbonate, is collected in a sump 25 at the base of regenerator 18, from where it is fed by way of a valved conduit 26 by means of a pump 27 to heat exchanger 14, where it loses heat, and then is returned to storage vessel 4 by way of conduit 15. The reconverted carbonate is then recycled to absorber 2 by way of conduit 5.

The sulfur-rich gas mixture produced in the regeneration reaction also may contain minor amounts of COS, $H_2O$, and $CO_2$. This gaseous mixture passes through a demister 28, which removes entrained liquid particles, and leaves regenerator 18 by way of a valved conduit 29 where it is fed to a sulfur storage tank 30.

The following examples illustrate the practice of the invention but are not intended to unduly limit its generally broad scope.

EXAMPLE 1

$SO_2$ absorption from flue gas

In one series of runs the feed gas consisted of $CO_2$ containing 0.1–20 vol. percent $SO_2$. The molten carbonate melt consisted of a ternary mixture of the carbonate of lithium, sodium, and potassium of approximately eutectic composition and was maintained at a temperature of about 500° C. The flow of $SO_2$ through the melt was varied from 1.5 to 24 cc./min. The inlet gas was preheated to about 400° C. before contacting the melt.

The final concentration of resultant alkali metal sulfite and molten carbonate varied from about 10 to 19.1 mole percent sulfite for feed gases having an initial concentration ranging from 1 to 18.2 vol. percent $SO_2$. Material balance analyses based on wet chemical analysis and gas chromatographic analysis together with continuous monitoring of the off flue gas showed that more than 99.9% of the $SO_2$ content was removed from the simulated flue gas. The foregoing example substantially is that described in application S.N. 638,528.

EXAMPLE 2

Reduction of alkali metal sulfite using carbon

Two runs were made in pressure vessels using appropriate amounts of lithium carbonate, potassium carbonate, and sodium sulfite to form the molten carbonate eutectic upon complete regeneration. In one run a coconut shell charcoal was used, a green petroleum coke being used in a second run. The pressure bombs were evacuated and inserted in a rocking furnace, and the rate of pressure build-up with time was followed. The reactions were carried out at 500° C., being observed to commence near 400° C., and were very rapid, maximum pressure being obtained in less than one hour without rocking. While the maximum attained pressure was 60–80 p.s.i.g., the pressure began to decrease after less than an hour of reaction, indicating reaction by intermediately formed $CO_2$ gas.

Both gas samples and the melt composition were analyzed. Gas chromatographic analysis confirmed that the evolved gas was $CO_2$. Analysis of the melt at various distances from the carbon-molten salt interface showed that several competing reactions occurred. At the carbon-melt interface itself, only molten alkali carbonate was present indicating full regeneration based on reaction of carbon dioxide with the sulfide in the melt. A total sulfur analysis of the melt made at the bottom of the bomb indicated that while 14.5 wt. percent of the sample was sulfur, no sulfite was present and only 4.8% of the sulfur was present as sulfide or sulfate, the remainder of the sulfur concentrating in the bottom of the bomb in the form of sulfur and polysulfide. Both runs showed essentially similar results.

EXAMPLE 3

Flow reduction of alkali metal sulfite using carbon

The reaction vessel used consisted of a stainless steel bomb constructed in such a manner that an inlet gas could be bubbled through the melt contained therein where so desired. A stainless steel screen spot-welded to the reaction vessel walls was used for supporting the bed of carbon used. Provision was also made for taking a molten salt sample periodically for analysis as well as for monitoring the off-gas. The bomb contained coconut shell charcoal that had been activated with high pressure steam and was 6–14 mesh size and had a maximum ash content of 5%. The mixture of alkali metal carbonates ($M_2CO_3$ where M=K, Li, Na,) corresponded to the ternary eutectic composition. This mixture was premelted and ground prior to insertion in the bomb. The bomb was inverted initially and $SO_2$ gas was bubbled in to charge the carbonate melt with sulfite. During the charging, neither the melt nor the $CO_2$ gas contacted the charcoal.

The starting material was 100% alkali metal carbonate eutectic containing 60 wt. percent carbonate ion; during the $SO_2$ absorption step the carbonate content decreased to 73% $M_2CO_3$ or 44.2 wt. percent carbonate ion. Off-gas analysis during the $SO_2$ pickup step indicated over 99.9% absorption, no $SO_2$ being present in the off-gas. After addition of the $SO_2$, the bomb was inverted so that the sulfite-containing melt was in contact with the charcoal. The regeneration run was made over a period of several days, the temperature used being between 450 and 700° C.

Analyses of the melt made during the course of the regeneration step revealed the presence of sulfate as well as sulfite. Final analysis of the regenerated melt showed that alkali metal carbonate had been fully regenerated (59.4 wt. percent carbonate ion) and that all the sulfite originally present in the melt as well as sulfate formed during regeneration, had been converted. No alkali metal sulfite or sulfate was detected. Because of excess charcoal present, the sulfur was present in the form of an adsorbed polysulfide on the charcoal, produced by reaction of alkali metal sulfide with formed sulfur.

In copending applications S.N. 638,528, S.N. 638,529, and S.N. 638,365, $H_2S$ is formed as the final product containing the sulfur values. For conversion to elemental sulfur, this $H_2S$ feedstock requires treatment in a Claus reactor. The present regeneration process is particularly advantageous where sulfur is desired as the final product, it being evolved directly from the regenerator without necessity for proceeding through a Claus reactor. Further, the direct production of sulfur by single-stage regeneration, compared with two-stage regeneration is generally advantageous where comparable yields are obtainable.

It will, of course, be realized that many variations in reaction conditions can be used in the practice of this invention, depending in part upon the particular sulfur oxide content of the flue gas to be desulfurized, as well as the hydrocarbon or fossil fuel serving as the source of combustion gas. The term "hydrocarbon or fossil fuel" broadly includes carbonaceous fuels, such as coal, oil-shale, petroleum products, natural gas, and associated waste products, such as acid sludges and tars.

Thus, while certain exemplary reactions have been described for the absorption and regeneration stages, it has been found, particularly with respect to the regeneration stage, that the actual mechanism of reaction is a highly complex one and several competing reactions may occur simultaneously. Therefore, to optimize each of the absorption and regeneration stages, varying reaction temperatures and pressures may be employed. Also, there may be employed a batch process or a continuous process, preferably the latter, with the usual provision for recycle of various unreacted or partially reacted components.

Further, even where the desired reactions do not go to completion and products are also presently produced by competing or undesired side reactions, the unreacted or undesired products may be recycled in the process without substantial interference with the basic absorption and regeneration stages. Thus, while the examples illustrating this invention have been described with respect to specific concentrations, times, temperatures, and other reactions, the invention may be otherwise practiced, as will be readily apparent to those skilled in this art. Accordingly, this invention is not to be limited by the illustrative and specific embodiments thereof, but its scope should be determined in accordance with the claims thereof.

We claim:
1. In a process including absorption and regeneration stages for removing sulfur dioxide from hot combustion gas produced by burning a sulfur-containing hydro-carbon fuel where:
 in the absorption stage the sulfur dioxide-containing combustion gas is contacted at a temperature of at least 350° C. with an initial molten salt mixture containing alkali metal carbonates as active absorbent for said sulfur dioxide to convert it to the sulfites of said alkali metals, and where
 in the regeneration stage the alkali metal sulfites are treated to form elemental sulfur as a recoverable product and regenerate the alkali metal carbonates for recirculation in the process,
 in combination with the absorption stage the improvement in the regeneration stage which comprises:
 reacting in a single-stage regeneration reaction at a temperature of at least 325° C. the alkali metal sulfite-containing molten salt obtained from said absorption stage with a carbonaceous material providing a source of reactive carbon under conditions favoring production of sulfur, which include using a stoichiometric excess of alkali metal sulfite in relation to the carbon present and maintaining pressurized conditions within the reaction zone to prevent removal therefrom of any intermediately formed carbon dioxide to thereby form sulfur as a recoverable product and at the same time regenerate the alkali metal carbonates for recirculation in the process.

2. The process according to claim 1 wherein the regeneration reaction temperature is maintained between 325 and 650° C. at which the alkali metal sulfite-containing salt is molten.

3. The process according to claim 2 wherein said reaction temperature is maintained between 450 and 550° C.

4. The process according to claim 1 wherein the source of reactive carbon is selected from the class consisting of carbon black, charcoal, and coke.

References Cited
UNITED STATES PATENTS
3,148,950  9/1964  Mugg _____ 23—224
3,236,589  2/1966  Reinhall et al. _____ 23—48

OSCAR R. VERTIZ, *Primary Examiner.*

G. O. PETERS, *Assistant Examiner.*